(12) United States Patent
Lee et al.

(10) Patent No.: US 7,956,492 B2
(45) Date of Patent: Jun. 7, 2011

(54) OUTLET SWITCH SOCKET DEVICE

(75) Inventors: Yu-Lung Lee, Nanjhuang Township, Miaoli County (TW); Ming-Chou Kuo, Taipei (TW)

(73) Assignee: Powertech Industrial Co., Ltd., Taipei Hsien (TW)

( * ) Notice: Subject to any disclaimer, the term of this patent is extended or adjusted under 35 U.S.C. 154(b) by 0 days.

(21) Appl. No.: 12/320,392

(22) Filed: Jan. 26, 2009

(65) Prior Publication Data

US 2010/0079001 A1 Apr. 1, 2010

(30) Foreign Application Priority Data

Sep. 26, 2008 (TW) .............................. 97137060 A

(51) Int. Cl.
*H02J 1/00* (2006.01)
(52) U.S. Cl. .......................................... 307/38; 307/115
(58) Field of Classification Search .................... 307/38, 307/40, 116, 139, 72; 340/825.72
See application file for complete search history.

(56) References Cited

U.S. PATENT DOCUMENTS

| | | | | |
|---|---|---|---|---|
| 7,274,303 B2 * | 9/2007 | Dresti et al. | ............. | 340/825.72 |
| 7,663,866 B2 * | 2/2010 | Lee et al. | ....................... | 361/601 |
| 2005/0105235 A1 * | 5/2005 | Yu | .................................. | 361/118 |
| 2008/0005000 A1 * | 1/2008 | Radl et al. | ........................ | 705/34 |
| 2008/0309164 A1 * | 12/2008 | Lim | .................................. | 307/39 |
| 2010/0044195 A1 * | 2/2010 | Chiang et al. | ................. | 200/175 |

FOREIGN PATENT DOCUMENTS

EP 1653572 A1 * 5/2006
WO WO 2007064118 A1 * 6/2007

* cited by examiner

*Primary Examiner* — Jared J Fureman
*Assistant Examiner* — Daniel Cavallari
(74) *Attorney, Agent, or Firm* — Rosenberg, Klein & Lee

(57) ABSTRACT

An outlet switch socket device includes a plug, at least one socket, at least one switch, a power converter, a communication module, a microprocessor and an infrared module. Moreover, the plug is used to receive an alternating current. Each switch is respectively coupled between each corresponding socket and the plug. The power converter is coupled to the plug and converts the alternating current into a direct current, thereby supplying the direct current to the microprocessor. Moreover, the microprocessor receives the direct current from the power converter and receives a control signal from a remote control via the communication module. Furthermore, the microprocessor is used to control those switches according to the control signal and transmits the control signal to the infrared module. The infrared module is used to output an infrared signal to control an infrared device.

2 Claims, 4 Drawing Sheets

OUTLET SWITCH SOCKET DEVICE

BACKGROUND OF THE INVENTION

1. Field of the Invention

The present invention relates to an outlet switch socket device; in particular, to an outlet switch socket device allowing both electronic device power control and electronic device function control features.

2. Description of Related Art

Currently available remote controls for controlling the functions of various types of audio-video switch socket device mostly use Infra-Red (IR) technology to perform wireless remote control. However, due to poor penetration of IR beam and directional limit, the emitter in the IR remote control needs to be substantially aimed at the IR receiver installed in the audio-video switch socket device so as to achieve the purpose of IR remote control. Therefore, in case that it is needed to remotely control a distant IR audio-video switch socket device, the IR technology may not be able to successfully meet such a requirement. Besides, there at present also exists a type of Radio Frequency (RF) remote control, which presents better radio penetration feature without undesirable directional limits, thus very suitable for the use as the remote control function.

In general, a common remote controlled outlet switch socket device comprises a receiver, which receives a control signal emitted from some remote device. Then, the socket on the remote controlled outlet switch socket device is under the control of the control signal to be set as conducting or not; thereby, the remote controlled outlet switch socket device may control whether to supply power to the electronic device plugged to the socket, further operating the power ON/OFF of such a plugged device. However, the aforementioned remote controlled outlet switch socket device can only control whether to supply power to the electronic device, but is still unable to control operations of other functions of the electronic device.

Accordingly, it is desirable for the industry to provide an outlet switch socket device allowing both electronic device power control and electronic device function control.

SUMMARY OF THE INVENTION

The present invention provides an outlet switch socket, which receives the Radio Frequency (RF) wireless remote control and further controls peripheral Infra-Red (IR) electronic devices based on the RF wireless remote control and by using IR technology. As such, the outlet switch socket device according to the present invention is allowed to control not only whether to supply power to the IR electronic device but, meanwhile, various functions thereof.

The outlet switch socket device according to a preferred embodiment of the present invention is controlled by a control signal, comprising: a plug, at least one socket, at least one switch, a power converter, a communication module, a microprocessor and an IR module. Herein the plug is used to receive an alternative current (AC) power. Each of the at least one switch is respectively connected in series between each corresponding socket and the plug. The power converter is coupled to the plug and used to convert the AC power into a direct current (DC) power. The communication module is used to receive a control signal. The microprocessor is coupled to the communication module, the power converter and the at least one switch to use the DC power, controlling the enable or disable of such switches based on the control signal and transferring the control signal to the IR module. The IR module is coupled to the microprocessor and emits an IR signal to an IR electronic device based on the control signal.

In summary, the outlet switch socket device according to the present invention combines the technologies of RF wireless remote control and IR control to remotely control an IR electronic device at a distance, thus providing both the control over power supply to the IR electronic device as well as the control over various functions of the IR electronic device. In this way, the present invention is allowed to effectively eliminate the drawback that conventional remote controlled outlet switch socket device can only control the power supply to the electronic device, but is unable to control other features thereof.

The summary introduced hereinbefore and detailed descriptions illustrated hereinafter are simply exemplary and addressed to further facilitate understanding in depth for the claimed scope of the present invention. Other objectives and advantages of the present invention will be thoroughly construed in the following descriptions and drawings.

DETAILED DESCRIPTION OF PREFERRED EMBODIMENTS

Figure 1:
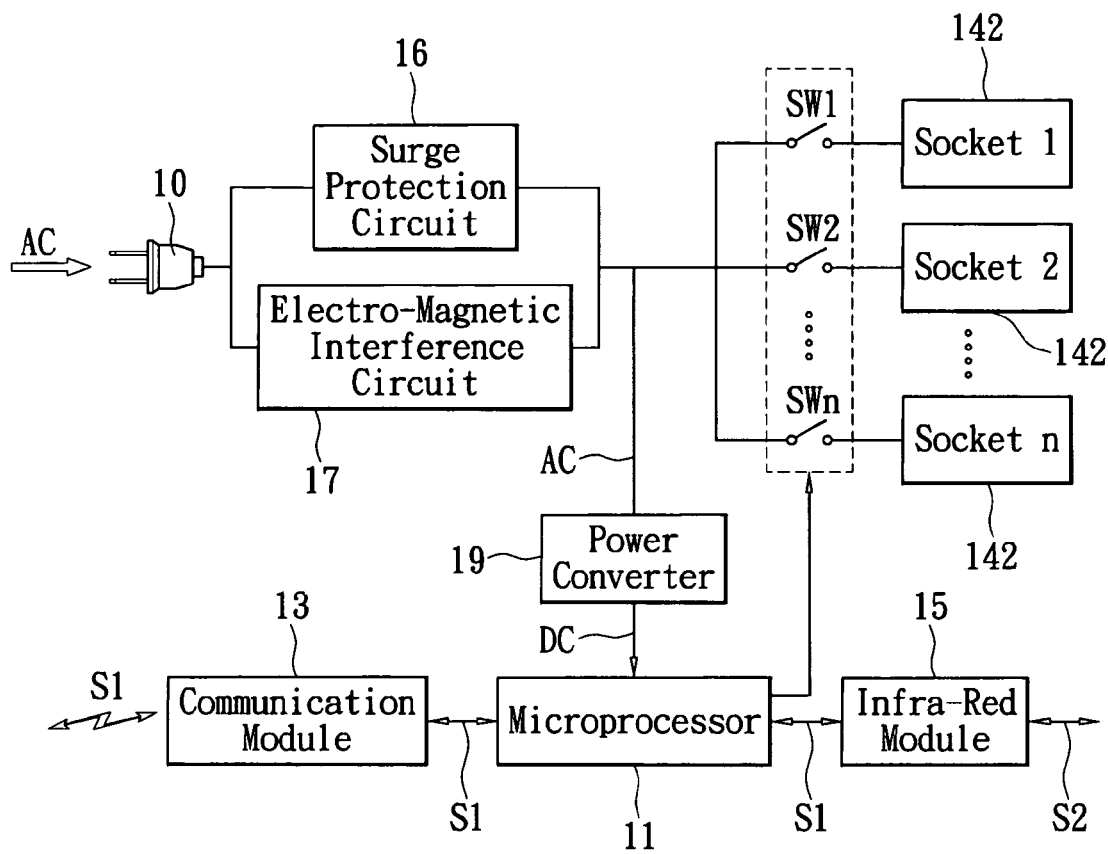
FIG. 1 is a circuit block diagram for the outlet switch socket device of a first preferred embodiment according to the present invention.

Refer now to FIG. 1, wherein a circuit block diagram for the outlet switch socket device of a first preferred embodiment according to the present invention is shown. Herein the outlet switch socket device 1 comprises a plug 10, at least one socket 142, at least one switch SW1~SWn, a power converter 19, a communication module 13, a microprocessor 11 and an IR module 15. Herein the plug 10 is used to receive an AC power, and each of the at least one switch SW1~SWn is respectively connected in series between each corresponding socket 142 and the plug 10.

Referring again to FIG. 1, the power converter 19 in the outlet switch socket device 1 is coupled to the plug 10, used to convert the alternative current (AC) power into a direct current (DC) power for the use by the microprocessor 11. The communication module 13 is a radio transceiver module which receives a control signal S1 from a remote control (not shown) in a RF wireless fashion, and transfers the received control signal S1 to the microprocessor 11. The microprocessor 11 is coupled to the communication module 13, the power converter 19 and the switches SW1~SWn, in which the microprocessor 11 receives the DC power, decodes the received control signal S1, and then controls the enable or disable of such switches SW1~SWn based on the decoded control signal S1, further controlling whether to supply power to the load. The aforementioned switches SW1~SWn each may be a relay or a TRIodes AC (TRIAC) switch.

Referring once again to FIG. 1, additionally, after decoding the control signal S1 by the microprocessor 11, it is further transferred to the IR module 15. The IR module 15 emits an IR signal S2 to an IR electronic device (not shown) based on the decoded control signal S1 to control the IR electronic device to perform functional operations. Meanwhile, the microprocessor 11 in the outlet switch socket device 1 may also acquire the operation status of the IR electronic device through the IR module 15, and send the acquired operation status to a distant remote control (not shown) via the communication module 13. Thereby, the user may observe the operation status in the IR electronic device through the display (not shown) installed on the remote control.

Referring yet once again to FIG. 1, in order to prevent the problems of surge and electro-magnetic interference, the outlet switch socket device 1 is further installed with a surge protection circuit 16, the surge protection circuit 16 being connected in series between the plug 10 and such switches SW1~SWn. At the same time, the outlet switch socket device 1 in the second (first?) preferred embodiment is also further installed with an electro-magnetic interference protection circuit 17, the electro-magnetic interference protection circuit 17 being connected in series between the plug 10 and such switches SW1~SWn.

Figure 2:
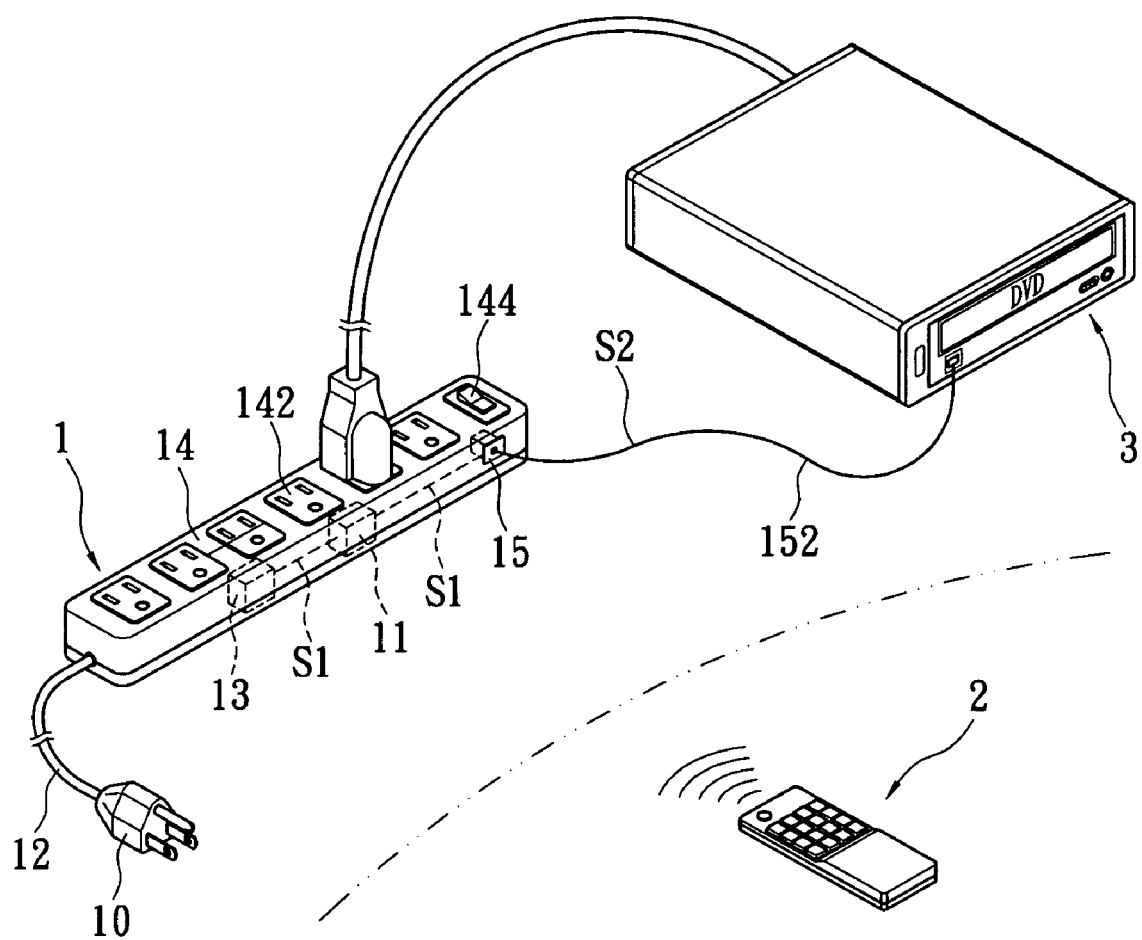
FIG. 2 is an application diagram for the outlet switch socket device of the first preferred embodiment according to the present invention.

In conjunction with FIG. 1, refer now to FIG. 2, wherein an application diagram for the outlet switch socket device of the first preferred embodiment according to the present invention is shown. In FIG. 2, the outlet switch socket device 1 according to the present invention is illustrated in a form of an extension line. Similarly, the outlet switch socket device 1 according to the present invention may also be implemented in a form of wall-tap typed socket. As such, FIG. 2 simply illustrates the application examples of the first preferred embodiment according to the present invention which is irrelevant to the definition regarding to the scope of the present invention.

Referring again to FIG. 2, the outlet switch socket device 1 comprises a plug 10, an extension line 12 and a body 14; herein, on the body 14 there install multiple sockets 142 and a switch 144. All sockets 142 on the body 14 can be controlled by the switch 144, and once the switch 144 is turned on, the AC power is conduced to the plug 10 and sent to each socket 142 thereon through the extension line 12 and the conducted switch 144 to allow the use by various loads.

Meanwhile, in the outlet switch socket device 1, there also includes a communication module 13, a microprocessor 11 and an IR module 15; herein the communication module 13 builds wireless communications with a distant remote control 2 in a RF wireless fashion. Besides, the microprocessor 11 in the outlet switch socket device 1 is coupled to the communication module 13 and the IR module 15, wherein the microprocessor 11 acquires through the communication module 13 the control signal S1 emitted from the remote control 2, decodes the acquired control signal S1, and then transfers the decoded control signal S1 to the IR module 15. Next, the IR module 15 sends an IR signal S2 to an IR electronic device 3 by way of an IR cable 152. At the same time, the microprocessor 11 decodes the control signal S1, and uses the decoded control signal S1 to control such sockets 142 whether to power the load.

In this way, the user is allowed to perform functional operations on the IR electronic device by using the remote control 2 through the outlet switch socket device 1 according to the present invention. Meanwhile, by means of bi-directional wireless communication with the communication module 13, the remote control 2 is allowed to acquire the operation status in the IR electronic device 3 through the outlet switch socket device 1 according to the present invention. Additionally, the multiple sockets 142 installed on the outlet switch socket device 1 according to the present invention can be controlled by the control signal S1 emitted by the remote control 2 as well, thus enabling further control over power supply for the use by the load.

Figure 3:
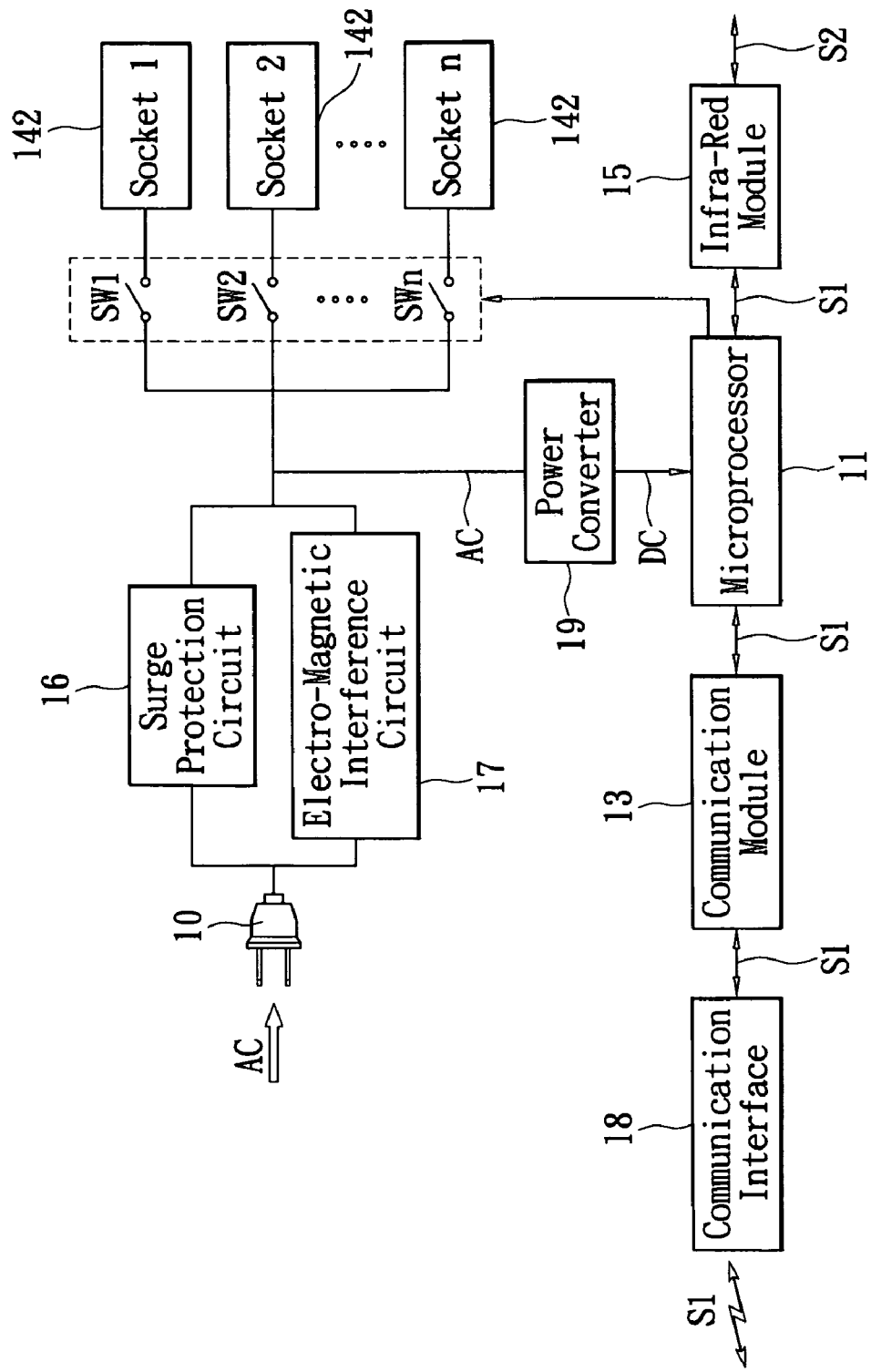
FIG. 3 is a circuit block diagram for the outlet switch socket device of a second preferred embodiment according to the present invention.

In conjunction with FIG. 1, refer now to FIG. 3, wherein a circuit block diagram for the outlet switch socket device of a second preferred embodiment according to the present invention is shown. The same components shown in both the second preferred embodiment and the first preferred embodiment are designated with the identical reference numbers. The second preferred embodiment and the first preferred embodiment can effectively equivalent, the major differences lie in that: the outlet switch socket device 1' in the second preferred embodiment further comprises a communication interface 18, in which the communication interface 18 is coupled to the communication module 13 and exemplified as a RJ-45 communication interface.

Figure 4:
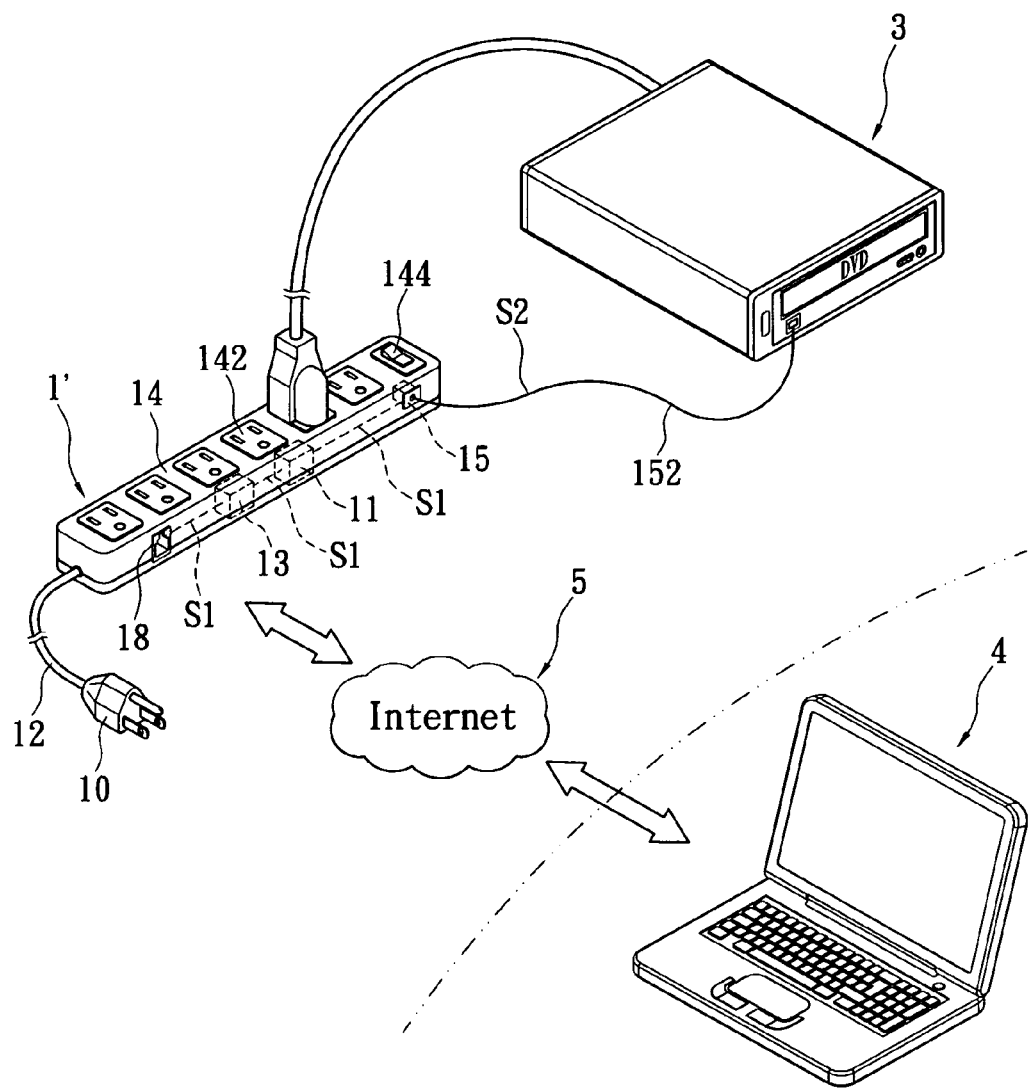
FIG. 4 is an application diagram for the outlet switch socket device of the second preferred embodiment according to the present invention.

In conjunction with FIG. 3, refer next to FIG. 4, wherein an application diagram for the outlet switch socket device of the second preferred embodiment according to the present invention is shown. In FIG. 4, the outlet switch socket device 1' according to the present invention is in a form of extension line as an example. Similarly, the outlet switch socket device 1' according to the present invention may also take a form of wall-tap type. As such, FIG. 4 simply illustrates the application examples of the second preferred embodiment according to the present invention which is irrelevant to the definition regarding to the scope of the present invention.

In FIG. 4, the communication module 13 of the outlet switch socket device 1' is coupled to the RJ-45 communication interface 18, the RJ-45 communication interface 18 being connected to a computer device 4 via Internet 5. The computer device 4 transfers the control signal S1 to the communication module 13 through Internet 5 and the RJ-45 communication interface 18. Then, the microprocessor 11 acquires the control signal S1 from the communication module 13, decodes the acquired control signal S1 and transfers to the IR module 15. Subsequently, the IR module 15 transfers an IR signal S2 to the IR electronic device 3 through an IR cable 152. Besides, the microprocessor 11 at the same time decodes the control signal S1 and controls such sockets 142 whether to supply power to the load based on the decoded control signal S1.

In the way, the user is allowed to perform functional operations on the IR electronic device 3 by using the computer device 4 through the outlet switch socket device 1' according to the present invention. Meanwhile, the computer device 4 is also allowed to acquire the operation status in the IR electronic device 3 by means of the outlet switch socket device 1' according to the present invention. Also, the multiple sockets installed on the outlet switch socket device 1' according to the present invention are controlled by the control signal S1 from the computer device 4, thus enabling further control over power supply for the use by the load.

In summary, the outlet switch socket device according to the present invention uses wireless remote control transceiving features, in combination with surge protection circuit, to provide an IR electronic device plugged in the outlet switch socket device with a stable and surge-protected power source.

Furthermore, the outlet switch socket device according to the present invention uses the built-in wireless communication module to receive the control signal outputted by a distant remote control, which control signal being decoded and transferred to the IR module, and therein the IR module emitting an IR signal based on the decoded control signal to control the IR electronic device.

Also, in addition to use of radio distant remote control, it is also possible to internally install a RJ-45 communication interface in the outlet switch socket device according to the present invention, allowing to link with a remote computer device via Internet. In this way, as the computer device is connected to the network, it is possible to use dedicated software executed on the computer device to issue control signals to the outlet switch socket device according to the present invention through Internet. Then the outlet switch socket device according to the present invention controls the IR electronic device via the IR module.

Thus, the outlet switch socket device according to the present invention combines the function of radio transmission/reception and provides IR connection to the IR electronic device required to be controlled remotely. In addition to provision of power supply that the IR electronic device needs, it is also possible to provide radio transmission/reception feature and ability of network remote control through the RJ-45 communication interface. The outlet switch socket device according to the present invention is not limited in terms of perspective or form thereof, but, based on the actual application environment, can be implemented in accordance with various shapes or forms, e.g. Strip, Wall-Tap, Rack-Mount and the like.

The aforementioned descriptions simply illustrate the preferred embodiments of the present invention, but the characteristics of the present invention are by no means limited thereto. All changes or modifications that skilled ones in the art can conveniently consider in the field of the present invention are deemed to be encompassed by the scope of the present invention delineated by the following claims.

What is claimed is:

1. An outlet switch socket device controlled by a control signal, comprising:
    a plug, which is used to receive alternative current (AC) power;
    at least one socket;
    one or more relays, each relay being respectively connected in series between each corresponding socket and the plug;
    an electro-magnetic interference protection circuit, connected in series between the plug and the relays;
    a power converter, which is coupled to the plug and used to convert the AC power into direct current (DC) power;
    a communication module, which is used to receive a control signal in a radio frequency (RF) wireless fashion, wherein the control signal is emitted from a remote control;
    a microprocessor, which is coupled to the communication module, the power converter and the relays, receives the DC power, and controls enabling or disabling of the relays based on the control signal;
    an infrared (IR) module, which is coupled to the microprocessor and an IR electronic device, the IR module receives the control signal from the microprocessor and emits an IR signal based on the control signal to control the IR electronic device;
    a surge protection circuit connected in series between the plug and the relays; and
    an RJ-45 communication interface, which is coupled to the communication module, wherein the RJ-45 communication interface is connected to a computer via Internet, and the computer outputs the control signal from a remote control via the Internet to the RJ-45 communication interface.

2. An outlet switch socket device controlled by a control signal, which is emitted from a remote control, comprising:
    one or more sockets;
    a surge protection circuit connected in series to the sockets;
    an electro-magnetic interference protection circuit connected in series to the sockets;
    one or more TRIodes AC (TRIAC), each TRIAC being respectively connected in series between each corresponding socket and a plug
    a communication module, which is used to receive the control signal in a radio frequency (RF) wireless fashion;
    a microprocessor, which is coupled between the communication module and the sockets, and is used to control whether to supply power to the sockets based on the control signal;
    a power converter coupled to the microprocessor, the power converter converting AC power into DC power and supplying the microprocessor with the DC power;
    an infrared (IRS module, which is coupled to the microprocessor and an IR electronic device, receives the control signal from the microprocessor and emits an IR signal based on the control signal to the IR electronic device; and
    a RJ-45 communication interface coupled to the communication module, wherein the RJ-45 communication interface is connected to a computer via Internet, and the computer outputs the control signal from the remote control via Internet to the RJ-45 communication interface.

* * * * *